US009733059B2

United States Patent
Gilmore

(10) Patent No.: US 9,733,059 B2
(45) Date of Patent: *Aug. 15, 2017

(54) METHOD FOR DETERMINING THE POSITION OF A TARGET ALONG A MOVEMENT AXIS WHILE BEING INSENSITIVE TO MOVEMENT OF THE TARGET ALONG AXES THAT ARE ORTHOGONAL TO THE MOVEMENT AXIS

(71) Applicant: American Axle & Manufacturing, Inc., Detroit, MI (US)

(72) Inventor: Curt D. Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,495

(22) Filed: May 10, 2016

(65) Prior Publication Data
US 2016/0252339 A1  Sep. 1, 2016

Related U.S. Application Data

(62) Division of application No. 14/259,640, filed on Apr. 23, 2014, now Pat. No. 9,347,764.

(51) Int. Cl.
*G01B 7/14* (2006.01)
*G01B 7/00* (2006.01)
(Continued)

(52) U.S. Cl.
CPC ........... *G01B 7/003* (2013.01); *G01B 7/14* (2013.01); *G01D 5/14* (2013.01); *G01D 5/2053* (2013.01)

(58) Field of Classification Search
CPC . G01B 7/003; G01B 7/14; G01D 5/14; G01D 5/2053
(Continued)

(56) References Cited

U.S. PATENT DOCUMENTS 4,737,698 A * 4/1988 McMullin ................ G01P 3/42
318/653
4,810,964 A * 3/1989 Granberg ................ G01B 7/14
241/37
(Continued)

FOREIGN PATENT DOCUMENTS

CN   102177414 A   9/2011
CN   102889898 A   1/2013
(Continued)

OTHER PUBLICATIONS

Chinese Office Action dated Jun. 12, 2017.

*Primary Examiner* — Jay Patidar
(74) *Attorney, Agent, or Firm* — Harness, Dickey & Pierce, P.L.C.

(57) ABSTRACT

A method that includes: providing a structure that is movable along a first axis; coupling a sensor assembly to the structure, the sensor assembly comprising first and second eddy current sensors and first and second targets that are mounted to the structure for movement along the first axis; sensing the first target with the first eddy current sensor and responsively generating a first sensor signal; sensing the second target with the second eddy current sensor and responsively generating a second sensor signal; and using the first and second sensor signals to determine a location of the structure along the first axis in a manner that is insensitive to coordinated movement of the first and second targets along a second axis that is perpendicular to the first axis and a third axis that is perpendicular to both the first and second axes.

14 Claims, 4 Drawing Sheets

(51) Int. Cl.
*G01D 5/14* (2006.01)
*G01D 5/20* (2006.01)

(58) Field of Classification Search
USPC .............................. 324/207.24, 207.12–243
See application file for complete search history.

(56) References Cited

U.S. PATENT DOCUMENTS

| | | |
|---|---|---|
| 5,291,782 A | 3/1994 | Taylor |
| 5,315,244 A | 5/1994 | Griebeler |
| 5,450,009 A | 9/1995 | Murakami |
| 5,608,317 A | 3/1997 | Hollmann |
| 6,479,990 B2 | 11/2002 | Mednikov et al. |
| 6,853,183 B2 | 2/2005 | Kindler |
| 7,173,417 B1 | 2/2007 | Poris et al. |
| 7,205,166 B2 | 4/2007 | Gotkis et al. |
| 7,295,004 B2 | 11/2007 | Kroner |
| 7,576,532 B2 | 8/2009 | Van Steenwyk et al. |
| 2006/0214657 A1 | 9/2006 | Tada et al. |
| 2007/0229064 A1 | 10/2007 | Van Steenwyk et al. |
| 2008/0054887 A1 | 3/2008 | Lee |
| 2008/0079420 A1 | 4/2008 | Hrubes et al. |
| 2010/0124792 A1 | 5/2010 | Iravani et al. |
| 2010/0164666 A1 | 7/2010 | Yang et al. |

FOREIGN PATENT DOCUMENTS

| | | |
|---|---|---|
| CN | 103229024 A | 7/2013 |
| WO | WO-2013007285 A1 | 1/2013 |

\* cited by examiner

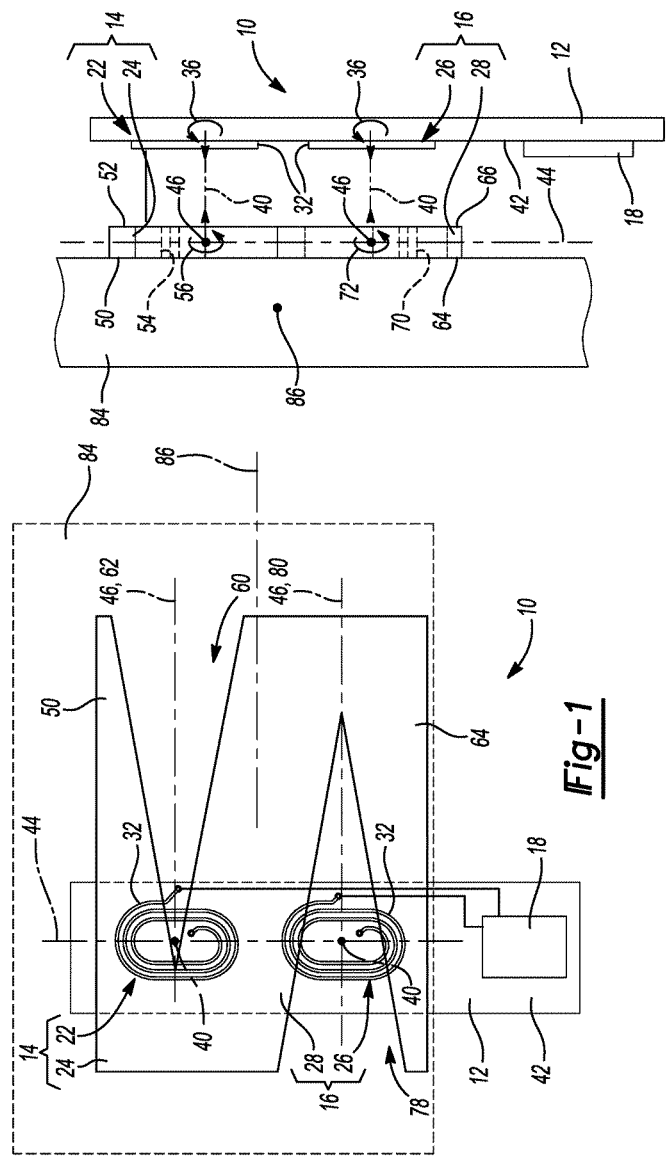

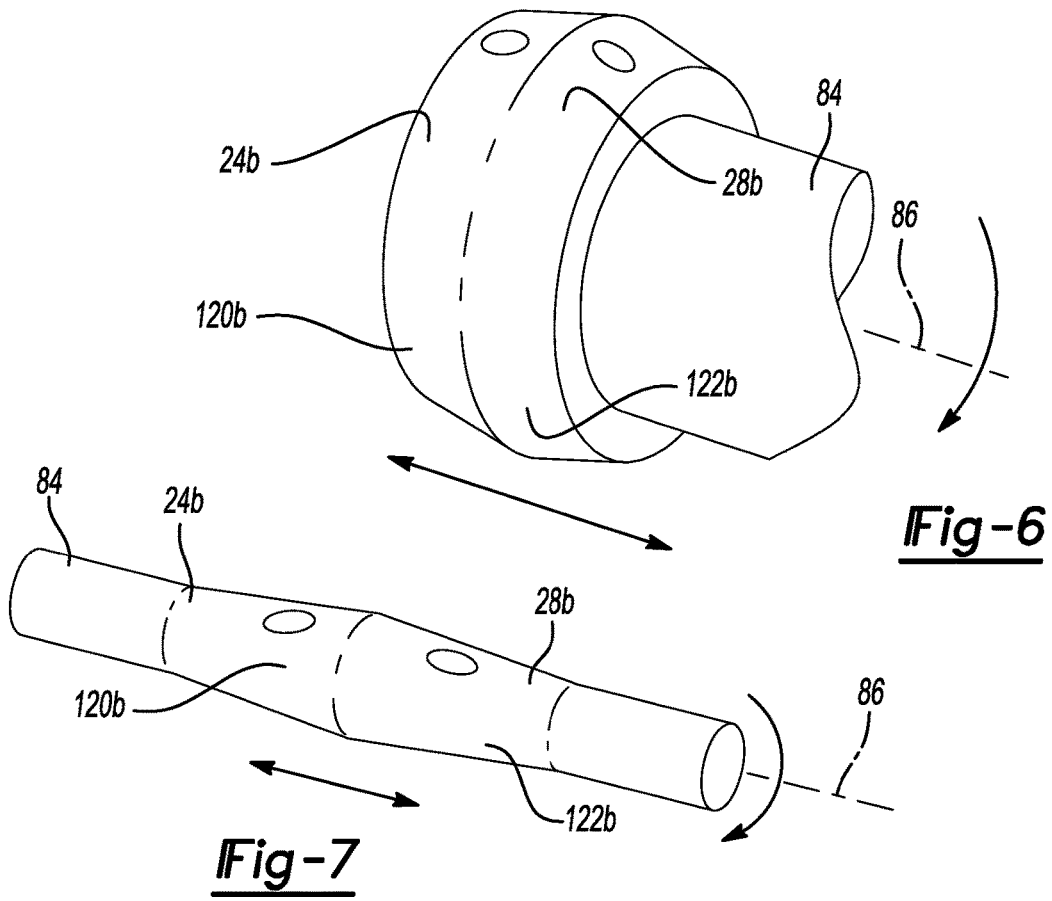
Fig-6
Fig-7
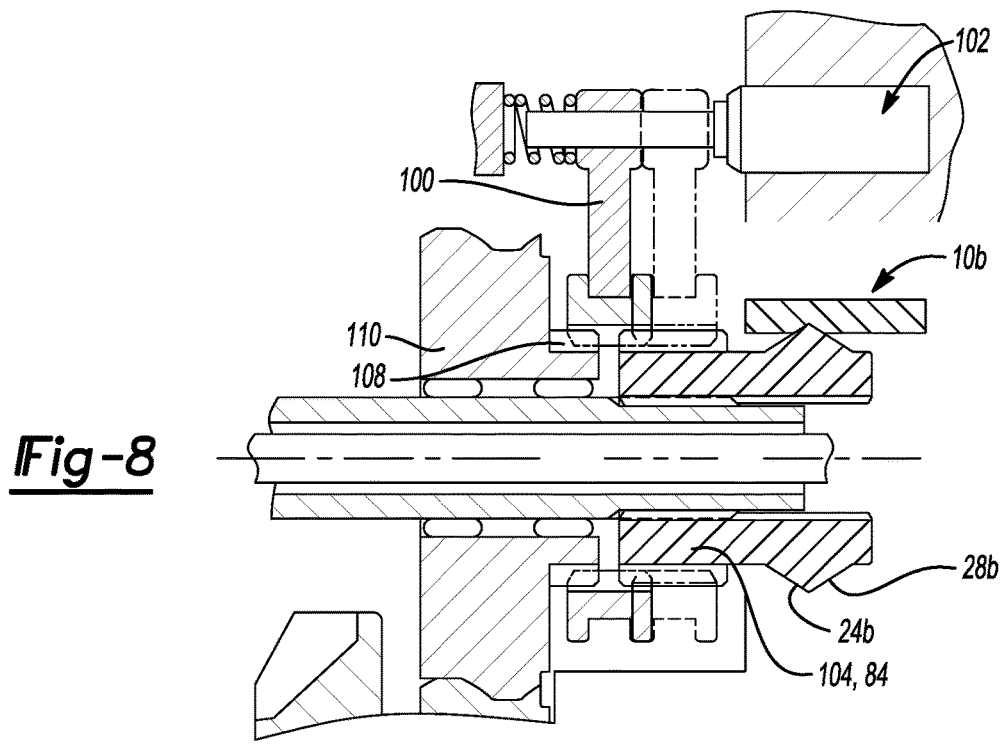
Fig-8

METHOD FOR DETERMINING THE POSITION OF A TARGET ALONG A MOVEMENT AXIS WHILE BEING INSENSITIVE TO MOVEMENT OF THE TARGET ALONG AXES THAT ARE ORTHOGONAL TO THE MOVEMENT AXIS

CROSS-REFERENCE TO RELATED APPLICATIONS

This is a divisional application of U.S. application Ser. No. 14/259,640 filed Apr. 23, 2014, the disclosure of which is incorporated by reference as if fully set forth in detail herein.

FIELD

The present disclosure relates to a method for determining the position of a target along a movement axis while being insensitive to movement of the target along axes that are orthogonal to the movement axis.

BACKGROUND

This section provides background information related to the present disclosure which is not necessarily prior art.

There is need in the art for an inexpensive, reliable and accurate sensor to monitor the position of a component that is translated along a movement axis, particularly in the field of actuators for driveline components. In this regard, actuators for driveline components typically present an environment that is not friendly to conventional sensors due to large thermal extremes, the presence of lubricant, and potentially the presence of metallic particles that are suspended in the lubricant. Since these sensors must operate reliably over an extended period of time, there is a desire to avoid the use of magnets in the sensors (e.g., Hall-effect sensors), since there is a possibility that metallic particles could be attracted to the magnet of the sensor.

SUMMARY

This section provides a general summary of the disclosure, and is not a comprehensive disclosure of its full scope or all of its features.

In one form, the present disclosure provides a sensor assembly for determining a location of a structure that is translated along a movement axis. The sensor assembly includes a sensor mount, first and second sensors, and first and second targets. The first sensor is coupled to the sensor mount and is an eddy current sensor that has a first X-axis, a first Y-axis and a first Z-axis that are orthogonal to one another. The first X-axis is disposed parallel to the movement axis. The first sensor includes a first coil that is wound helically around the first Z-axis. The second sensor is coupled to the sensor mount and is an eddy current sensor that has a second X-axis, a second Y-axis, and a second Z-axis that are orthogonal to one another. The second X-axis is parallel to the first X-axis. The second Z-axis is parallel to the first Z-axis. The second sensor includes a second coil that is wound helically around the second Z-axis. The first target is configured to be coupled to the structure for movement therewith. The first target is formed of an electrically conductive material and is configured to interact with the first sensor to produce a first sensor signal that has a first magnitude that varies proportionally with movement of the first target along the first X-axis. The second target is configured to be coupled to the structure for movement therewith. The second target is formed of an electrically conductive material and is configured to interact with the second sensor to produce a second sensor signal that has a second magnitude that varies proportionally with movement of the second target along the second X-axis. The first and second targets are configured so that coordinated movement of the first and second targets within predefined limits in a direction parallel to the first and second Z-axes as the structure is moved along the movement axis is detectable from the first and second sensor signals.

In another form, the present disclosure provides a sensor assembly for determining a location of a structure that is translated along a movement axis. The sensor assembly includes a sensor mount, first and second sensors, first and second targets and a controller. The first sensor is coupled to the sensor mount and is an eddy current sensor that has a first X-axis, a first Y-axis and a first Z-axis that are orthogonal to one another. The first X-axis is disposed parallel to the movement axis. The first sensor includes a first coil that is wound helically around the first Z-axis. The second sensor is coupled to the sensor mount and is an eddy current sensor that has a second X-axis, a second Y-axis, and a second Z-axis that are orthogonal to one another. The second X-axis is parallel to the first X-axis. The second Z-axis is parallel to the first Z-axis. The second sensor includes a second coil that is wound helically around the second Z-axis. The first target is configured to be coupled to the structure for movement therewith. The first target is formed of an electrically conductive material and is configured to interact with the first sensor to produce a first sensor signal that has a first magnitude that varies in a first predetermined manner with movement of the first target along the first X-axis. The second target is configured to be coupled to the structure for movement therewith. The second target is formed of an electrically conductive material and is configured to interact with the second sensor to produce a second sensor signal that has a second magnitude that varies in a second predetermined manner with movement of the second target along the second X-axis. The controller receives the first and second sensor signals and responsively determines the location of the structure along the movement axis. The first and second targets are configured such that coordinated movement of the first and second targets in a direction parallel to the first and second Z-axes within predefined limits as the structure is moved along the movement axis has no effect on the location of the structure that is determined by the controller.

In a further form, the present teachings provide a method that includes: providing a structure that is movable along a movement axis; coupling a sensor assembly to the structure, the sensor assembly comprising first and second eddy current sensors and first and second targets that are mounted to the structure for movement along the movement axis; sensing the first target with the first eddy current sensor and responsively generating a first sensor signal; sensing the second target with the second eddy current sensor and responsively generating a second sensor signal; and using the first and second sensor signals to determine a location of the structure along the movable axis in a manner that is insensitive to coordinated movement of the first and second targets in a first direction that is perpendicular to the movement axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic top plan view of a sensor assembly constructed in accordance with the teachings of the present disclosure;

FIG. 2 is a schematic right side view of the sensor assembly of FIG. 1;

Figure 3:
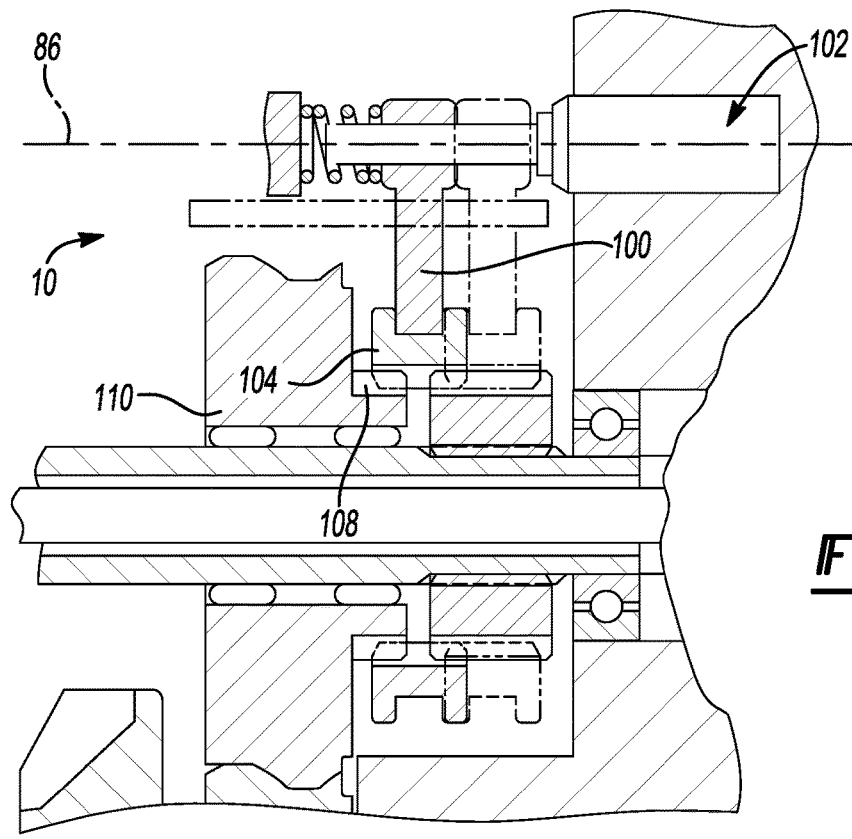
FIG. 3 is a sectional, partly schematic view of the sensor assembly of FIG. 1 integrated into a vehicle driveline component having a clutch.

FIGS. 4 through 7 are views depicting alternately constructed portions of the sensor assembly of FIG. 1, the alternately constructed portions being first and second sensor targets; and FIG. 8 is a view similar to that of FIG. 3 but depicting the sensor assembly constructed in accordance with the teachings of the present disclosure as employing first and second sensor targets that are configured in the manner depicted in FIG. 6 and mounted to a synchronizer.

Corresponding reference numerals indicate corresponding parts throughout the several views of the drawings.

DETAILED DESCRIPTION

Example embodiments will now be described more fully with reference to the accompanying drawings.

With reference to FIGS. 1 and 2, a sensor assembly constructed in accordance with the teachings of the present disclosure is generally indicated by reference numeral 10. The sensor assembly 10 can include a sensor mount 12, a first sensor portion 14, a second sensor portion 16 and a controller 18. The sensor mount 12 can be any type of structure, such as a circuit board, to which the first and second sensor portions 14 and 16 can be mounted.

The first sensor portion 14 can include a first sensor 22 and a first target 24, while the second sensor portion 16 can include a second sensor 26 and a second target 28. Each of the first and second sensors 22 and 26 can include a coil 32 that is mounted to the sensor mount 12 and configured to generate a magnetic field 36 when activated (i.e., when receiving alternating current). Each of the coils 32 can be oriented such that it disposed along an associated Z-axis 40 that extends perpendicular from a surface 42 of the sensor mount 12 to which the coils 32 are mounted. The wire of each coil 32 can be wound helically about the associated Z-axis 40 of the coil such that the coils 32 have a generally annular shape. Alternately, each of the coils 32 is wound in a helical manner that is parallel to the associated Z-axis 40 and parallel to an axis that is perpendicular to the associated Z-axis 40. In the particular example provided, each of the coils 32 is wound helically about its Z-axis 40 in a manner that is elongated about its Y-axis 44 so that when viewed from a plane that includes its X-axis 46 and Y-axis 44, the coils 32 are generally oval in shape.

The first target 24 can be formed of a plate-like piece of an electrically conductive material that has opposite surfaces 50 and 52 that are oriented perpendicular to the Z-axis 40. The first target 24 is configured to interact with the magnetic field 36 generated by the coil 32 of the first sensor 22. More specifically, placement of the first target 24 into the magnetic field 36 generated by the coil 32 of the first sensor 22 can induce eddy currents 54 in the first target 24. The eddy currents 54 induced in the first target 24 can create an opposing magnetic field 56 that can interact with the magnetic field 36 generated by the coil 32 of the first sensor 22; the first sensor 22 can output a first sensor signal that is responsive to the magnitude of the opposing magnetic field 56. The first sensor 22 is configured so that the magnitude of the interaction between the magnetic field 36 and the opposing magnetic field 56 is dependent upon a distance between the first target 24 and the coil 32 of the first sensor 22 along the Z-axis 40. The first target 24, however, is also configured to also render the first sensor 22 sensitive to the placement of the first target 24 along the X-axis 46. In this regard, the first target 24 can be shaped in a manner that varies the amount of the electrically conductive material in which the opposing magnetic field 56 is generated as a function of the placement of the first target 24 along the X-axis 46. For example, the first target 24 can be shaped so that the output of the first sensor 22 is ratiometric when the first target 24 is moved only along the X-axis 46. In the particular example provided, the first target 24 defines a generally V-shaped notch or aperture 60 that is formed through the material that forms the first target 24 and aligned such that the axis 62 of the V-shaped notch 60 is disposed in a plane that includes the Z-axis 40 and the X-axis 46.

The second target 28 can be formed of a plate-like piece of an electrically conductive material that has opposite surfaces 64 and 66 that are oriented perpendicular to the Z-axis 40. The second target 28 is configured to interact with the magnetic field 36 generated by the coil 32 of the second sensor 26. More specifically, placement of the second target 28 into the magnetic field 36 generated by the coil 32 of the second sensor 26 can induce eddy currents 70 in the second target 28. The eddy currents 70 induced in the second target 28 can create an opposing magnetic field 72 that can interact with the magnetic field 36 generated by the coil 32 of the second sensor 26; the second sensor 26 can output a second sensor signal that is responsive to the magnitude of the opposing magnetic field 72. The second sensor 26 is configured so that the magnitude of the interaction between the magnetic field 36 and the opposing magnetic field 72 is dependent upon a distance between the second target 28 and the coil 32 of the second sensor 26 along the Z-axis 40. The second target 28, however, is also configured to also render the second sensor 26 sensitive to the placement of the second target 28 along the X-axis 46. In this regard, the second target 28 can be shaped in a manner that varies the amount of the electrically conductive material in which the opposing magnetic field 72 is generated as a function of the placement of the second target 28 along the X-axis 46. For example, the second target 28 can be shaped so that the output of the second sensor 26 is ratiometric when the second target 28 is moved only along the X-axis 46. In the particular example provided, the second target 28 defines a generally V-shaped notch or aperture 78 that is formed through the material that forms the second target 28 and aligned such that the axis 80 of the V-shaped notch 78 is disposed in a plane that includes the Z-axis 40 and the X-axis 46.

The first and second targets 24 and 28 can be fixedly coupled to one another for common movement. For example, the first and second targets 24 and 28 can be fixedly mounted to a structure 84 that is movable at least along a movement axis 86 that is parallel to the X-axes 46. The first and second targets 24 and 28 can be aligned in coordinated manner relative to the first and second sensors 22 and 26, respectively, such that the Z-axes 40 are parallel to one another, the X-axes 46 are parallel to one another and to the movement axis 86, the Y-axes 44 are parallel one another, and the axes 62, 80 of the V-shaped notches 60, 78 are parallel to one another and aligned along the X-axes 46. In the particular example provided, the structure 84 to which the first and second targets 24 and 28 are coupled is a piece of aluminum plate into which the first and second targets 24 and 28 are formed. It will be appreciated that the first and second targets 24 and 28 could be formed as discrete components that are mounted to another structure to reduce cost and/or weight as desired. Moreover, it will be appreciated that the first and second targets 24 and 28 could be offset from one another along the Z-axis 40 of the first sensor 22, and/or that the first and second sensors 22 and 26 could be similarly offset from one another along the Z-axis 40 of the first sensor 22.

The controller 18 can be coupled to any desired structure, such as the sensor mount 12, and can be configured to receive the first and second sensor signals and to responsively determine a position of the structure 84 along the movement axis 86.

The second target 28 can be configured to interact with second sensor 26 in a manner that is different from the manner in which the first target 24 is configured to interact with the first sensor 22 so that the manner in which the second sensor signal varies in response to movement of the structure 84 along the movement axis 86 is different from the manner in which the first sensor signal varies in response to movement of the structure 84 along the movement axis 86. In the particular example provided, the V-shaped notch 78 of the second target 28 is oriented opposite to the V-shaped notch 60 of the first target 24 so that movement of the structure 84 along the movement axis 86 in a first direction is associated with enlargement of the width of the V-shaped notch 60 of the first target 24 along the Y-axis 44 of the first sensor 22, and reduction of the width of the V-shaped notch 78 of the second target 28 along the Y-axis 44 of the second sensor 26.

The V-shaped notch 60 in the first target 24 renders the first sensor portion 14 an absolute position sensor for positions along the X-axis 46 within a predetermined range. Similarly, the V-shaped notch 78 in the second target 28 renders the second sensor portion 16 an absolute position sensor for positions along the X-axis 46 within the predetermined range. Moreover, if there is no movement of the first and second targets 24 and 28 along the Z-axis 40 relative to the coils 32, the value of the output of one of the first and second sensors 22 and 26 can be determined based on the value of the output of the other one of the first and second sensors 22 and 26 (i.e., the value of the second sensor signal can be determined based on the value of the first sensor signal and vice versa).

In situations where the first and second targets 24 and 28 move in a coordinated manner along the Z-axis 40, the values of the first and second sensor signals will be higher or lower (relative to their values when there is no movement along the Z-axis 40) depending on whether the first and second targets 24 and 28 have moved toward or away from the coils 32. As such, the values of the first and second sensor signals will not relate to one another in the expected manner (i.e., as though there is no movement along the Z-axis 40) but rather will include a common offset. The controller 18 can be configured to identify the existence of a common offset and to effectively remove the common offset from the values of the first and second sensor signals to thereby isolate the portion of the first and second sensor signals that relates to the absolute position of the structure 84 along the movement axis 86 from signal noise that relates to movement of the structure along the Z-axis 40.

As an example, suppose that the values (y1, y2) of the first and second sensor signals are related to the position (x) of the structure 84 along the movement axis 86 (within predefined limits) in a linear manner according to the formulas:

$$y1 = m(x) - b; \text{ and}$$

$$y2 = b - m(x);$$

where (m) is a predefined slope and (b) is a predefined constant. In a situation where the structure 84 is moved only along the movement axis 86 and does not move along the Z-axis 40, the values of y1 and y2 will sum to zero (i.e., the value of y2 is the additive inverse of y1). Accordingly, the controller 18 can average the values of y1 and y2 determine information relevant to the positioning of the structure 84 along the Z-axis 40. For example, if the average is non-zero, the structure 84 has been positioned at a location along the Z-axis 40 that deviates from a predefined location. Additionally, the absolute value of the average is indicative of the magnitude by which the position of the structure 84 deviates along the Z-axis 40 from the predefined location, and the sign (positive or negative) of the average is indicative of the direction along the Z-axis 40 that the structure 84 is located relative to the predefined location.

Alternatively, the location of the structure 84 along the movement axis 86 can be determined by dividing the value of one of the first and second sensor signals by the sum of the values of the first and second sensor signals (e.g., the value of the first sensor signal divided by the sum of the values of the first and second sensor signals). Because the first and second sensor portions 14 and 16 employ a dual sensor configuration with complementing outputs, the controller 18 can: a) determine the value of each of the first and second sensor signals, b) determine the sum of the values, c) determine a first ratio that is equal to the value of the first sensor signal to the sum of the values, d) determine a second ratio that is equal to the value of the second sensor signal to the sum of the values, and e) determine the location of the structure 84 along the movement axis 86 based on the first and second ratios.

Construction of the sensor assembly 10 in this manner can be relatively inexpensive, eliminates the need for calibration of the sensor assembly 10, requires relatively little space for the packaging of the sensor assembly 10, and permits the axial location of the structure 84 to be determined along the movement axis 86 with accuracy that can be better than 0.5% regardless of changes in voltage, temperature or the presence of vibration.

Figure 2A:
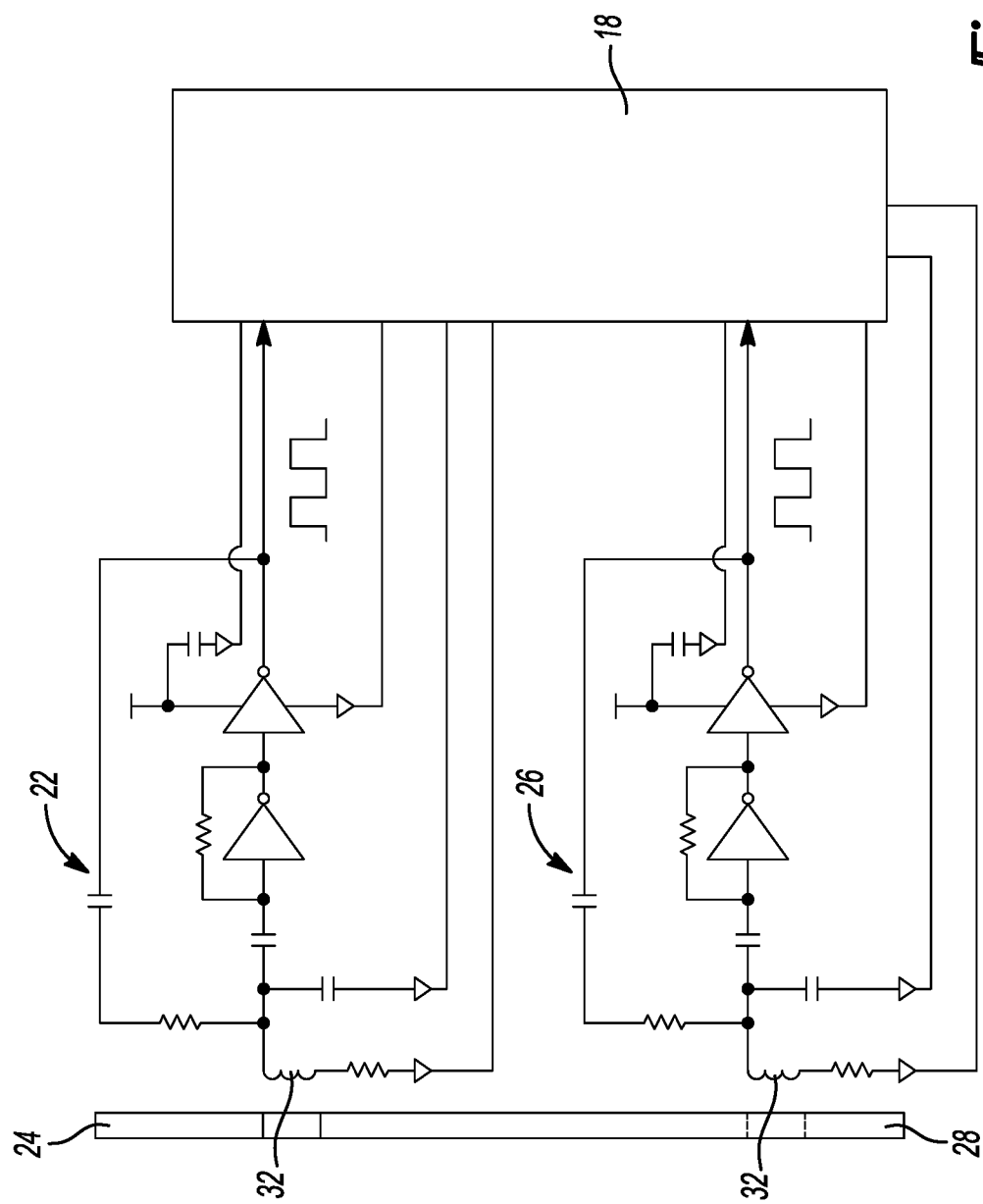
FIG. 2A is a schematic illustration of the sensor assembly that depicts each of the eddy current sensors as including an RLC gate-oscillator circuit that generates a frequency output.

With reference to FIG. 2A, each of the first and second sensors 22 and 26 can include an RLC gate-oscillator circuit that cooperates with the eddy current sensor to generate a frequency output that is dependent on the magnetic field produced by the coils 32 of the first and second targets 24 and 26, respectively, and the opposing magnetic fields 56 and 72 (FIG. 2).

In FIG. 3, the sensor assembly 10 can be employed to sense a position of a clutch fork 100 that is moved by a linear actuator 102 along a movement axis 86. The clutch fork 100 is engaged to a synchronizer 104 in a conventional manner and is employed for translating the synchronizer 104 into and out of meshing engagement with a plurality of first coupling teeth 108 that are coupled to a driven gear 110 for common rotation. Those of skill in the art will appreciate that the structure 84 is the clutch fork 100 and that the first and second targets 24 and 28 (FIG. 1) are mounted directly to (or alternatively formed in) the clutch fork 100. The linear actuator 102 can be any type of device that is configured to translate the clutch fork 100 along the movement axis 86. In the particular example provided, the linear actuator 102 is a electromagnetically operated solenoid, but those of skill in the art will appreciate that other types of linear motors, including fluid-powered cylinders, could be employed in the alternative.

Figure 4:
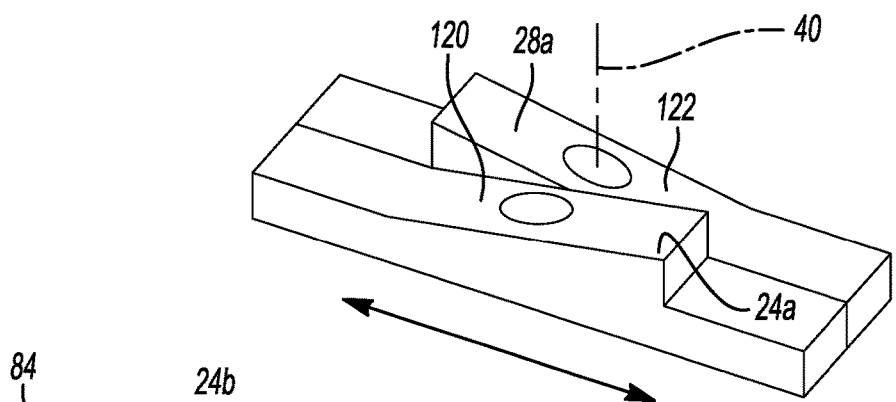
Figure 5:
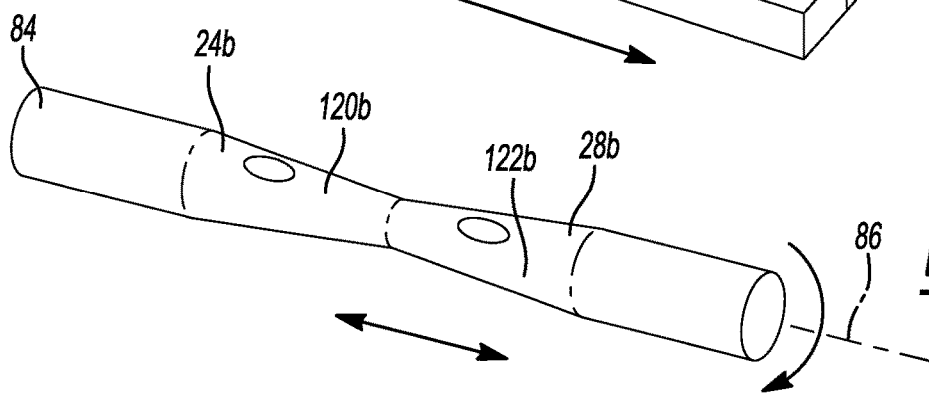

While the first and second targets 24 and 28 (FIG. 1) have been described as comprising V-shaped notches 60, 78 (FIG. 1), those of skill in the art will appreciate from this disclosure that the first and second targets 24 and 28 (FIG. 1) could be shaped differently. For example, the first and second targets could be shaped as tapered surfaces as shown in FIGS. 4 through 7. In FIG. 4, the first and second targets 24a and 28a comprise sensing surfaces 120 and 122, respectively, that taper along the Z-axes 40 in a ratiometric manner. In FIGS. 5 through 7, the first and second targets 24b and 28b comprise frusto-conical sensing surfaces 120b and 122b, respectively, that taper in a radial direction. Configuration in this latter manner may be particularly suitable for situations in which the structure 84 is also rotatable about the movement axis 86 and the first and second targets 24b and 28b are coupled to the structure 84 for rotation and axial movement therewith.

In FIG. 8, the sensor assembly 10b can be employed to sense a position of a rotating synchronizer 104 that is moved by a clutch fork 100 and a linear actuator 102. The clutch fork 100 is engaged to a synchronizer 104 in a conventional manner and is employed for translating the synchronizer 104 into and out of engagement with a plurality of first coupling teeth 108 that are coupled to a driven gear 110 for common rotation. Those of skill in the art will appreciate that the structure 84 is the synchronizer 104 and that the first and second targets 24b and 28b are formed on a portion of the synchronizer 104 that is disposed on a side opposite the first coupling teeth 108.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
providing a structure that is movable along a first axis;
supporting a sensor assembly adjacent to the structure, the sensor assembly comprising first and second eddy current sensors and first and second targets, the first and second targets being mounted to the structure for movement with the structure along the first axis, and the first and second eddy current sensors being positioned adjacent to, but spaced apart from, the first and second targets;
sensing the first target with the first eddy current sensor and responsively generating a first sensor signal;
sensing the second target with the second eddy current sensor and responsively generating a second sensor signal; and
determining a location of the structure along the first axis based on the first and second sensor signals, wherein the determined location is insensitive to coordinated movement of the first and second targets along a second axis that is perpendicular to the first axis and a third axis that is perpendicular to both the first and second axes.

2. The method of claim 1, wherein each of the first and second eddy current sensors comprise a coil of wire and wherein each coil has an oval cross-sectional shape taken in a plane that is parallel to the first and second axes.

3. The method of claim 1, wherein at least one of the first and second targets defines an aperture.

4. The method of claim 3, wherein the aperture is V-shaped.

5. The method of claim 1, wherein at least one of the first and second targets defines a ramp that is sloped along a fourth axis that is parallel to the third axis.

6. The method of claim 1, wherein at least one of the first and second targets defines a frusto-conical surface.

7. The method of claim 1, wherein at least one of the first and second targets is rotatable about a fourth axis that is parallel to the first axis.

8. A method comprising:
providing a structure that is movable along a first axis;
supporting a sensor assembly adjacent to the structure, the sensor assembly comprising first and second eddy current sensors and first and second targets, the first and second targets being mounted to the structure for movement along the first axis, and the first and second eddy current sensors being positioned adjacent to, but spaced apart from, the first and second targets;
sensing the first target with the first eddy current sensor and responsively generating a first sensor signal;
sensing the second target with the second eddy current sensor and responsively generating a second sensor signal; and
using the first and second sensor signals to determine a location of the structure along the first axis in a manner that is insensitive to coordinated movement of the first and second targets along a second axis that is perpendicular to the first axis and a third axis that is perpendicular to both the first and second axes.

9. The method of claim 8, wherein each of the first and second eddy current sensors comprise a coil of wire and wherein each coil has an oval cross-sectional shape taken in a plane that is parallel to the first and second axes.

10. The method of claim 8, wherein at least one of the first and second targets defines an aperture.

11. The method of claim 10, wherein the aperture is V-shaped.

12. The method of claim 8, wherein at least one of the first and second targets defines a ramp that is sloped along a fourth axis that is parallel to the third axis.

13. The method of claim 8, wherein at least one of the first and second targets defines a frusto-conical surface.

14. The method of claim 8, wherein at least one of the first and second targets is rotatable about a fourth axis that is parallel to the first axis.

* * * * *